United States Patent
Wu et al.

(10) Patent No.: US 10,513,649 B2
(45) Date of Patent: Dec. 24, 2019

(54) REVERSE EMULSION-BASED SLICK WATER CONCENTRATION SYSTEM WITH DRAG REDUCTION, FLOW BACK ENHANCEMENT AND CLAY STABILIZATION FUNCTIONS

(71) Applicant: Yangtze University, Jingzhou (CN)

(72) Inventors: Jun Wu, Houston, TX (US); Wei-Chu Yu, Jingzhou (CN)

(73) Assignee: YANGTZE UNIVERSITY, Jingzhou (CN)

(*) Notice: Subject to any disclaimer, the term of this patent is extended or adjusted under 35 U.S.C. 154(b) by 124 days.

(21) Appl. No.: 15/792,709

(22) Filed: Oct. 24, 2017

(65) Prior Publication Data

US 2018/0112119 A1 Apr. 26, 2018

(30) Foreign Application Priority Data

Oct. 25, 2016 (CN) .......................... 2016 1 0932997

(51) Int. Cl.
| | |
|---|---|
| C09K 8/36 | (2006.01) |
| B01F 17/00 | (2006.01) |
| C08F 2/22 | (2006.01) |
| C09K 8/584 | (2006.01) |
| C09K 8/88 | (2006.01) |
| C11D 1/00 | (2006.01) |

(52) U.S. Cl.
CPC ............ *C09K 8/36* (2013.01); *B01F 17/0035* (2013.01); *C08F 2/22* (2013.01); *C09K 8/584* (2013.01); *C09K 8/882* (2013.01); *C11D 1/004* (2013.01); *C09K 2208/12* (2013.01); *C09K 2208/28* (2013.01)

(58) Field of Classification Search
CPC ........ C08F 220/06; C08F 220/56; C08F 2/22; C08F 2/44; B01F 17/0035; C09K 2208/12; C09K 2208/28; C09K 8/28; C09K 8/36; C09K 8/584; C09K 8/88; C09K 8/882; C11D 1/004
See application file for complete search history.

(56) References Cited

U.S. PATENT DOCUMENTS

| | | | |
|---|---|---|---|
| 7,482,310 B1* | 1/2009 | Reese ................ | C09K 8/64 166/270 |
| 2010/0324166 A1* | 12/2010 | Wu ..................... | C09K 8/68 523/122 |
| 2012/0157356 A1* | 6/2012 | Dawson ............. | C09K 8/602 507/219 |
| 2014/0051620 A1* | 2/2014 | Soane ................. | C09K 8/36 508/471 |
| 2015/0133347 A1* | 5/2015 | Chung ................ | C09K 8/588 507/121 |

* cited by examiner

*Primary Examiner* — Alicia Bland
(74) *Attorney, Agent, or Firm* — Hemisphere Law, PLLC; Zhigang Ma

(57) ABSTRACT

A reverse emulsion-based slick water concentration system, wherein the reverse emulsion is obtained by dispersing an aqueous phase A to an oil phase B under mechanical agitation; wherein the aqueous phase A is composed of a water-soluble monomer A1, a water-soluble fluorocarbon surfactant A2, a water-soluble quaternary ammonium clay stabilizer A3 and water A4; wherein the oil phase B comprises an oil-soluble dispersant/surfactant B1, an oil-soluble radical initiator B2 and a hydrophobic solvent B3 as a dispersing medium; wherein the percentages of each component described above, relative to the total weight of the reaction system is as the following: water-soluble monomer A1: 5.0-30.0%; water-soluble fluorocarbon surfactant A2: 0.1-5.0%; water-soluble quaternary ammonium clay stabilizer A3: 0.1-15.0%; water A4: 5.0-35.0%; oil-soluble dispersant/surfactant B1: 0.1-5.0%; oil-soluble radical initiator B2: 0.000001-0.100%; hydrophobic solvent B3: remainder.

2 Claims, No Drawings

REVERSE EMULSION-BASED SLICK WATER CONCENTRATION SYSTEM WITH DRAG REDUCTION, FLOW BACK ENHANCEMENT AND CLAY STABILIZATION FUNCTIONS

BACKGROUND OF THE INVENTION

1. Field of the Invention

The present invention relates to a slick water concentrate, especially relates to a reverse emulsion-based slick water concentration system with coexistent functions of drag reduction, water flow back enhancement and clay stabilization.

2. Description of Related Arts

With the extensive shale oil and gas exploration and development, the utilization of slick water fracturing to improve reservoir permeability receives considerable attention. Slick water refers to a fluid where small amounts of drag reducing agent, flow back surfactant and clay stabilizer are added to fresh or saline water. In the fracturing process, the high-pressure slick water quickly penetrates the ground, fracturing oil and gas reservoirs to improve permeability. Thus, greatly enhanced hydrocarbon productivity is the result.

Currently, during slick water fracturing, a plurality of different classes of chemicals include drag reducer, flow back surfactant and clay stabilizer are stored separately and simultaneously in the field. These different chemicals may be solid or liquid, and are transported under various forms of packaging to the well site before fracking operation takes place. Liquids are normally stored in tanks, whereas solids may have to be isolated in a designated area with rain-proof measure m place. These chemical agents are to be comingled in a common blending device before the resultant slick water is to be pumped downhole for fracking.

Shale oil and gas fields are often in locations such as mountainous areas with poor communications and transportation. However, fracking dictates a prerequisite of mixing a variety of chemicals to generate slick water before pumping. This leads to many problems: 1) shipping a variety of chemicals to mountainous area is not convenient and therefore leads to substantial costs and risks; 2) A lot of space at the fracking site is to be taken, as multiple tanks and dedicated storage areas are needed for various chemicals; 3) the use of a plurality of pipes and pressure manifold for chemical blending dictates substantial manpower and resources with drastically increased security issues and operational errors. Therefore, the development of a slick water concentrate with multiple functionalities such as drag reduction, flow back enhancement and clay stabilization to tackle these issues with reduced transportation, storage, operation costs and minimized security risks and operation errors is keenly sought after by personnel in their pursuit of shale exploration and production.

SUMMARY OF THE INVENTION

A reverse emulsion-based slick water concentration system, is obtained by dispersing an aqueous phase A to an oil phase B under mechanical agitation; wherein the aqueous phase A is composed of a water-soluble monomer A1, a water-soluble fluorocarbon surfactant A2, a water-soluble quaternary ammonium clay stabilizer A3 and water A4; wherein the oil phase B comprises an oil-soluble dispersant/surfactant B1, an oil-soluble radical initiator B2 and a hydrophobic solvent 133 as a dispersing medium; wherein, the percentages of each component described above, relative to the total weight of the reaction system is as the following: water-soluble monomer A1: 5.0-30.0%; water-soluble fluorocarbon surfactant A2: 0.1-5.0%; water-soluble quaternary ammonium clay stabilizer A3: 0.1-15.0%; water A4: 5.0-35.0%; oil-soluble dispersant/surfactant B1: 0.1-5.0%; oil-soluble radical initiator B2: 0.000001-0.100%; hydrophobic solvent B3: remainder.

The triple-play reverse emulsion-based slick water concentration system with drag reduction, flow back enhancement and clay stabilization functions, retains the original properties of drag reducing agent, which can achieve up to 70% drag reduction efficiency during hydraulic fracturing. Meanwhile, the introduction of fluorocarbon surfactants and quaternary ammonium clay stabilizers realize the functions of flow back enhancement and clay stabilization and therefore can achieve a surface tension of 30 mN/m or less, and interfacial tension of 3.0 mN/m or less, and 70% clay swelling protection and above. As a slick water concentrate, only a tank, a pipeline and a pump are required to prepare slick water on-the-fly with a desired ratio of 0.01 to 1.0%. Greatly reduced risk and cost of the operation is the result.

DETAILED DESCRIPTION OF THE INVENTION

The following specific embodiments in conjunction with the present invention will be further described in the preparation of 100.0 kg of the slick water concentrate with drag reduction, flow back enhancement and clay stabilization functions.

The "3-in-1" triple play concentration system with drag reduction, flow back enhancement and clay stabilization is realized via reverse emulsion polymerization during the synthesis of the polymeric drag reducing agent, by adding to the aqueous phase of the "W/O" "water-in-oil" reverse emulsion, a small amount of solid, water-soluble high-performance fluorocarbon surfactant (as a flow back aid to reduce interfacial tension) and a small amount of solid, water-soluble high-performance small molecule or macromolecule clay stabilizer containing quaternary ammonium ions (to prevent clay from swelling). The small amount, small volume, high-performance fluorocarbon flow back surfactants and quaternary ammonium-based clay stabilizer contains no carbon-carbon double bond and therefore do not participate the polymerization process, but are coexistent with the resultant drag reducing macromolecules inside the reverse emulsion concentrate. The reverse emulsion polymeric drag reducing agent may be an ordinary water-soluble polymer or a polymer modified by hydrophobic or fluorocarbon moieties for reduced inter-molecular and molecular-reservoir friction coefficient for formation damage mitigation.

The present invention achieves the above objectives by the following technical solution: A slick water concentration system, with triple play functions of drag reduction, clay stabilization and water flow back enhancement, is obtained by conducting a reverse emulsion polymerization at elevated temperature, wherein the reverse emulsion is obtained by dispersing an aqueous phase A to an oil phase B under mechanical agitation; wherein the aqueous phase A is composed of a water-soluble monomer A1, a water-soluble fluorocarbon surfactant A2, a water-soluble quaternary ammonium clay stabilizer A3 and water A4; wherein the oil phase B comprises an oil-soluble dispersant/surfactant B1, an oil-soluble radical initiator B2 and a hydrophobic solvent B3 as a dispersing medium; wherein, the percentages of each component described above, relative to the total weight of the reaction system is as the following: water-soluble monomer A1: 5.0-30.0%; water-soluble fluorocarbon surfactant A2: 0.1-5.0%; water-soluble quaternary ammonium clay stabilizer A3: 0.1-15.0%; water A4: 5.0-35.0%; oil-soluble dispersant/surfactant B1: 0.1-5.0%; oil-soluble radical initiator B2: 0.000001-0.100%; hydrophobic solvent B3: remainder.

Water-soluble monomer A1 is one or more water-soluble monomers selected from the group consisting of hydroxyethyl acrylate, hydroxyethyl methacrylate, hydroxypropyl acrylate, hydroxypropyl methacrylate, ethoxylated-2-hydroxyethyl acrylate, ethoxylated-2-hydroxyethyl methacrylate, hydroxymethyl styrene, vinyl acetate, acrylamide, dimethyldiallylammonium chloride, [2-(methacryloyloxy)ethyl] trimethylammonium chloride, [2-(acryloyloxy)ethyl] trimethylammonium chloride, (3-acrylamidopropyl) trimethylammonium chloride, [3-(methacryloylamino)propyl]trimethylammonium chloride, methacryloyloxyethyl dimethylbenzylammonium chloride, methacryloxyethyl-dimethylbenzylammonium chloride, acrylic acid, sodium acrylate, potassium acrylate, methacrylic acid, sodium methacrylate, potassium methacrylate, 2-acrylamido-2-methyl sulfonic acid, 2-acrylamido-2-methylpropane sulfonate, and 2-acrylamido-2-methyl propane sulfonic acid potassium or sodium salt.

The fluorocarbon surfactant A2 is one or more of the ingredients selected from the group consisted of water-soluble anionic fluorocarbon surfactant, water-soluble cationic fluorocarbon surfactant, water-soluble nonionic fluorocarbon surfactant, water-soluble zwitterionic fluorocarbon surfactant, and water-soluble Gemini fluorocarbon surfactant, including perfluorooctanoic acid (PFOA), lithium perfluorooctanate, sodium perfluorooctanate, potassium perfluorooctanate, ammonium perfluorooctanate, perfluorooctane sulfonic acid, lithium perfluorooctane sulfonate, sodium perfluorooctane sulfonate, and potassium perfluorooctane sulfonate.

The quaternary ammonium clay stabilizer A3 is one or more of the ingredients selected from the group consisted of water-soluble quaternary ammonium clay stabilizer including tetramethylammonium chloride, choline chloride, butyltrimethylammonium chloride, octyltrimethylammonium chloride, lauryltrimethylammonium chloride, and poly(dimethyldiallylammonium chloride).

The oil-soluble dispersant/surfactant B1 is one or more of the ingredients selected from the group consisting of oil-soluble dispersants/surfactants including sorbic acid anhydride, alkylphenol poly(vinyl ether), fatty alcohol poly(oxyethylene ether), oleic acid diethanolamide, poly(ethylene glycol monolaurate), and polyethylene sorbitan ester.

The oil-soluble radical initiator B2 is single component or a mix selected from the group of oil-soluble radical initiators including azobisisobutyronitrile and 2,2'-Azobis(2-methylbutyronitrile).

The hydrophobic solvent B3 is selected from the group consisted of hydrophobic solvents including naphthenic oil, base oil, mineral oil, and diesel.

The above-described drag reducing agent is completely polymerized via water-soluble monomers. Further, the subject drag reducing agent may be macromolecules modified with hydrophobic or fluorocarbon moieties along their polymeric backbones. Based on the above-mentioned technical solution, a mutual solvent A5 and a hydrophobic monomer A6, or a mutual solvent A5 and a fluorocarbon monomer A7 can be introduced to the aqueous phase of the reverse emulsion before polymerization. Thus, the resultant polymeric drag reducing agent may have a hydrophobic or a fluorocarbon-containing monomer unit with reduced intermolecular friction coefficient and molecular-reservoir friction coefficient for formation damage mitigation.

Wherein A5 is the mutual solvent that dissolves both the water-soluble monomer and hydrophobic or fluorocarbon moiety and it includes one or more of the group consisting of ethylene glycol monobutyl ether, dimethylformamide, alcohol derivatives, aldehyde derivatives, ketone derivatives, ether derivatives, and other derivatives of dimethyl sulfoxide Wherein A6 is one or more hydrophobic monomers selected from the group consisting of hydrophobic monomers including methyl acrylate, methyl methacrylate, ethyl acrylate, ethyl methacrylate, propyl acrylate, propyl methacrylate, butyl acrylate, butyl methacrylate and styrene.

Wherein the fluorocarbon-containing monomer A7 is one or more of the components selected from the group consisting of fluorocarbon-containing monomers including pentafluorophenyl acrylate, 1,1,1,3,3,3-hexafluoro isopropyl acrylate, 1H,1H,3H-hexafluorobutyl acrylate, 2,2,2-trifluoroethyl acrylate, and perfluorodecyl acrylate.

Example 1

The weights of each component are as the following: water-soluble monomer A1: acrylamide, 5.0 kg; water-soluble fluorocarbon surfactant A2: sodium perfluorooctanoate, 0.2 kg; water-soluble quaternary ammonium clay stabilizer A3: choline chloride, 1.0 kg; water A4: water, 20.0 kg; oil-soluble dispersant/surfactant B1: sorbic anhydride, 0.2 kg; oil-soluble radical initiator B2: azobisisobutyronitrile, 0.00010 kg; hydrophobic solvent B3: mineral oil, 73.5999 kg.

The above-described A1, A2, A3, A4 are homogenized to generate aqueous phase A with using mechanical stirring. The components B1, B2 and B3 are homogenized to generate oil phase B with mechanical stirring. The aqueous phase A is added to the oil phase B under rapid mechanical stirring to generate a reverse emulsion mixture. The mixture is then warmed to 60-80° C. to initiate polymerization. The resultant system is the slick water concentrate with drag reduction, flow back enhancement and clay stabilization triple-play functions.

Example 2

The weights of each component are as the following: water-soluble monomer A1: vinyl acetate 1.0 kg, acrylamide, 4.0 kg; water-soluble fluorocarbon surfactant A2: sodium perfluorooctanoate, 0.2 kg; water-soluble quaternary ammonium clay stabilizer A3: choline chloride, 1.0 kg; mutual solvent A5: ethylene glycol monobutyl ether, 3.0 kg; hydrophobic monomer A6: butyl acrylate, 0.10 kg; water A4: water, 20.0 kg; oil-soluble dispersant/surfactant B1: sorbic anhydride, 0.30 kg; oil-soluble radical initiator B2: azobisisobutyronitrile, 0.00020 kg; hydrophobic solvent B3: mineral oil, 70.3998 kg.

The components A1, A2, A3, A5, A6 and A4 are homogenized to form the aqueous phase A after mixing with mechanical stirring. The components B1, B2, B3 are homogenized to form the oil phase B after mixing with mechanical stirring. The aqueous phase A is added to the oil phase B under rapid mechanical stirring to generate a reverse emulsion mixture. The mixture is then warmed to 60-80° C. to initiate reverse emulsion polymerization. The resultant is a hydrophobically-modified slick water concentrate with drag reduction, flow back enhancement and clay stabilization triple-play functions.

Example 3

The weights of each component are as the following: water-soluble monomer A1: sodium acrylate, 1.0 kg, acrylamide, 5.0 kg; water-soluble fluorocarbon surfactant A2: sodium perfluorooctanoate, 0.20 kg; water-soluble quaternary ammonium clay stabilizer A3: choline chloride, 1.50 kg; mutual solvent A5: ethylene glycol monobutyl ether, 3.50 kg; fluorocarbon-containing monomer A7: pentafluorophenyl acrylate, 0.10 kg; water A4: water, 20.0 kg; oil-soluble dispersant/surfactant B1: sorbic anhydride, 0.3 kg; oil-soluble radical initiator B2: azobisisobutyronitrile, 0.00020 kg; hydrophobic solvent B3: mineral oil, 68.3998 kg.

The components A1, A2, A3, A5, A7 and A4 are homogenized under mechanical stirring to generate aqueous phase A. Then, the components B1, B2 and B3 are homogenized after mixing with mechanical stirring to generate oil phase B. The aqueous phase A is added to the oil phase B under conditions of rapid mechanical stirring, to generate a reverse emulsion mixture. The mixture is then warmed to 60-80° C. to initiate reverse emulsion polymerization. The resultant polymer system is fluorocarbon-modified drag reducer with drag reduction, clay stabilization and flow back enhancement triple-play functions.

The triple-play reverse emulsion-based slick water concentration system with drag reduction, flow back enhancement and clay stabilization functions, retains the original properties of drag reducing agent, which can achieve up to 70% drag reduction efficiency during hydraulic fracturing. Meanwhile, introduction of fluorocarbon surfactants and quaternary ammonium clay stabilizers realize the functions of flow back enhancement and clay stabilization and therefore can achieve a surface tension of 30 mN/m or less, and interfacial tension of 3.0 mN/m or less, and 70% clay swelling protection and above. As a slick water concentrate, only a tank, a pipeline and a pump are required to prepare the slick water on-the-fly with a desired ratio of 0.01 to 1.0%. Greatly reduced risk and cost of the operation is the result.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A reverse emulsion-based slick water concentration system, obtained by reverse emulsion polymerization at elevated temperature, wherein the reverse emulsion polymerization is conducted by dispersing an aqueous phase A into an oil phase B to form a reverse emulsion before polymerization takes place; wherein, the said aqueous phase A comprises a water-soluble monomer A1, a water-soluble fluorocarbon surfactant A2, a water-soluble quaternary ammonium clay stabilizer A3 and water A4; wherein the oil phase B comprises an oil-soluble dispersant/surfactant B1, an oil-soluble radical initiator B2 and a hydrophobic solvent B3 as dispersion medium; wherein the weight percent of each component based on the total weight of the reaction system is: water-soluble monomer A1: 5.0-30.0%; water-soluble fluorocarbon surfactant A2: 0.1-5.0%; water-soluble quaternary ammonium clay stabilizer A3: 0.1-15.0%; water: 5.0-35.0%; oil-soluble dispersant/surfactant B1: 0.1-5.0%; oil-soluble radical initiator B2: 0.000001-0.100%; hydrophobic solvent B3: remainder; wherein the water-soluble monomer A1 is hydroxyethyl methacrylate, the water-soluble fluorocarbon surfactant A2 is water-soluble cationic fluorocarbon surfactant, the quaternary ammonium salt A3 is tetramethylammonium chloride, the oil-soluble dispersant/surfactant B1 is sorbic anhydride, the oil-soluble radical initiator B2 is azobisisobutyronitrile, the hydrophobic solvent B3 is naphthenic oil.

2. The reverse emulsion-based slick water concentration system as described in claim 1, wherein a mutual solvent A5 and a hydrophobic monomer A6 may be introduced to the aqueous phase A, or wherein a mutual solvent A5 and a fluorocarbon monomer A7 may be added to the aqueous phase A to generate polymeric drag reducer with backbone modified with hydrophobic or fluorocarbon moiety to minimize inter-molecular friction coefficient and the friction coefficient between macromolecules and reservoir for formation damage mitigation; wherein the said mutual solvent A5 is ethylene glycol monobutyl ether; wherein the said hydrophobic monomer A6 is methyl acrylate; wherein the said fluorocarbon monomer A7 is perfluorodecyl acrylate.

* * * * *